J. & I. N. Todd.
Fan.
Nº 44237. Patented Sept. 13. 1864.
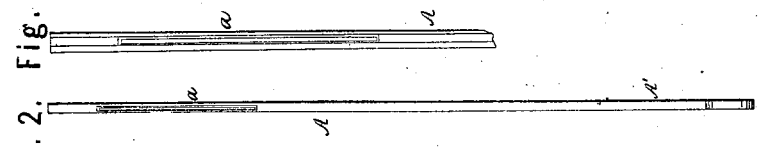
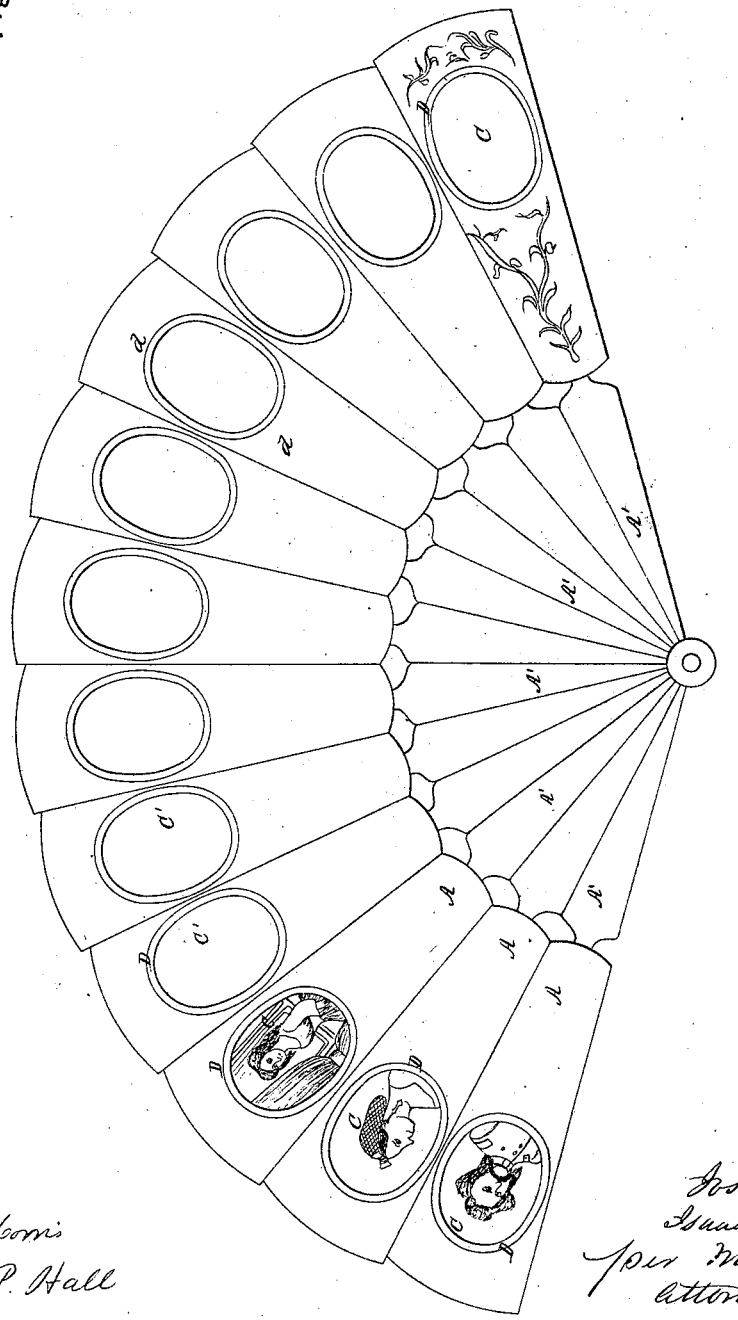
Witnesses.
Henry Morris
James P. Hall
Inventors.
Jos Todd
Isaac N. Todd
per Munn &c
attorney

UNITED STATES PATENT OFFICE.

JOSEPH TODD AND ISAAC N. TODD, OF MADISON, INDIANA.

IMPROVEMENT IN LADIES' FANS.

Specification forming part of Letters Patent No. 44,237, dated September 13, 1864.

*To all whom it may concern:*

Be it known that we, JOSEPH TODD and ISAAC N. TODD, both of Madison, in the county of Jefferson and State of Indiana, have invented a new and useful Improvement in Fans; and we do hereby declare that the following is a full, clear, and exact description thereof, which will enable others skilled in the art to make and use the same, reference being had to the accompanying drawings, making a part of this specification, in which—

Figure 1 gives an illustration of our invention; Fig. 2, an edge view of one of the folding leaves of our fan, showing the slit for inserting the picture; Fig. 3, a detail of one of the leaves enlarged, the stock A' being broken away.

Similar letters of reference indicate like parts.

Our invention consists in providing a series of receptacles in the blades or leaves of folding fans for photographic and other pictures, so that they may be inserted and removed at pleasure. The receptacles may be in a single series, or of more than one series, arranged in any suitable order to please the taste of the manufacturer or the buyer.

A represents the leaves or blades of a folding fan, mounted upon their stocks A'. The leaves are to be of a length and breadth to suit the size of the fan intended to be made, or to suit the size of the pictures intended to be secured in them. In this illustration of our invention the pictures are to be inserted in slits a, made across the broad parts of the leaves of the fan, after the manner of securing pictures in the leaves of photographic albums. The slit is intersected by an opening, C', which may be made through the leaf, or else through the front half of its thickness, so as to leave the back part solid for a backing to the picture and to preserve the strength of the leaf. The pictures, however, may be inserted in other ways. The slit in the leaf may be at the outer end instead of at the sides; or the leaves of the fan may be perforated by short slits like d, through which tongues projecting from the top and bottom edges of a picture-frame may be passed and secured by binding over or riveting on the back, or strips or card-board or other suitable material may be neatly secured at their outer ends by pasting or other means across the top and bottom of the leaf—say, above and below the lines d—and the ends of the frame or card containing the picture may be slipped under the strips. The leaves may be ornamented in any proper style, and borders D be made around the opening or place on the leaf which surrounds the picture or its frame.

The leaves of the fan may be made with or without a web. If with a web, the ornaments will of course be made on its surface, and the perforations for the pictures must then be made also through the web.

Other kinds of fans may be thus constructed and fitted up to receive pictures, but the folding-leaf fan is best adapted to this end, because the pictures will be fully protected from injury when the fan is not in use, as fully as if they were secured in an album.

We claim as new and desire to secure by Letters Patent—

1. Constructing the leaves or blades of fans in the manner substantially as described, so as to receive photographic and other pictures.

2. The combination of a photographic album with a fan substantially as above described.

JOS. TODD.
ISAAC N. TODD.

Witnesses:
HENRY P. LEE,
I. HENDRICKS.